United States Patent [19]

Tomita et al.

[11] Patent Number: 5,754,354
[45] Date of Patent: May 19, 1998

[54] MAGNETIC DISK DRIVE UNIT WITH COMPLEX MAGNETIC HEAD OF VARIABLE READING WIDTH

[75] Inventors: Isamu Tomita; Tsuyoshi Furukawa, both of Kawasaki, Japan

[73] Assignee: Fujitsu Limited, Kawasaki, Japan

[21] Appl. No.: 345,583

[22] Filed: Nov. 28, 1994

[30] Foreign Application Priority Data

Feb. 3, 1994 [JP] Japan ................... 6-011811

[51] Int. Cl.⁶ ................................. G11B 15/12
[52] U.S. Cl. ........................... 360/61; 360/113
[58] Field of Search ................. 360/113, 121, 360/61, 63, 66, 46, 77.08, 78.14, 78.09, 122

[56] References Cited

U.S. PATENT DOCUMENTS

| | | | |
|---|---|---|---|
| 3,955,213 | 5/1976 | Brower et al. | 360/122 |
| 4,757,410 | 7/1988 | Seko et al. | 360/113 |
| 5,081,554 | 1/1992 | Das | 360/113 |
| 5,107,385 | 4/1992 | Kelley | 360/113 |
| 5,132,861 | 7/1992 | Behr et al. | 360/77.07 X |
| 5,420,736 | 5/1995 | Heim et al. | 360/113 |
| 5,465,183 | 11/1995 | Hattori | 360/28.09 |

FOREIGN PATENT DOCUMENTS

| | | |
|---|---|---|
| 3147511 | 6/1991 | Japan . |
| 4157608 | 5/1992 | Japan . |

*Primary Examiner*—Aristotelis M. Psitos
*Assistant Examiner*—Patrick Wamsley
*Attorney, Agent, or Firm*—Greer, Burns & Crain, Ltd.

[57] ABSTRACT

A magnetic disk drive unit includes a first read amplifier connected to an inductive head, a second read amplifier connected to a magneto-resistive head, a selective output unit for selecting either an output of the first read amplifier or an output of the second read amplifier and supplying a selected output to a demodulator, and a control unit for supplying a switching control signal. When reading servo information written onto a data surface of a magnetic recording medium, the control unit controls the switching control signal and thus causes the selective output unit to select an output of the first read amplifier associated with the inductive head. By the constitution, servo information can be detected in a wide range using a relatively simple data-surface servo pattern. This realizes high-precision off-tracking compensation.

7 Claims, 11 Drawing Sheets

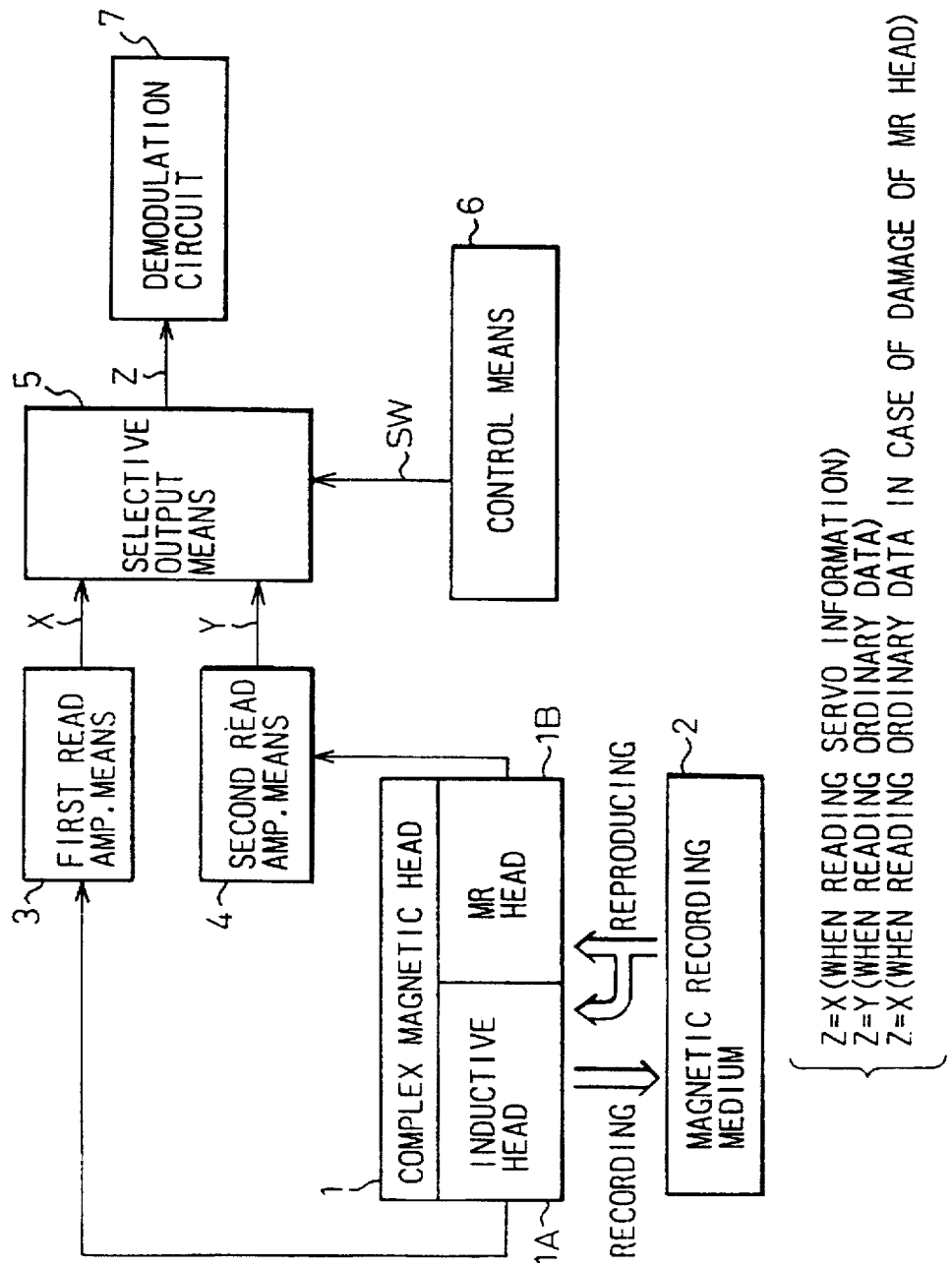

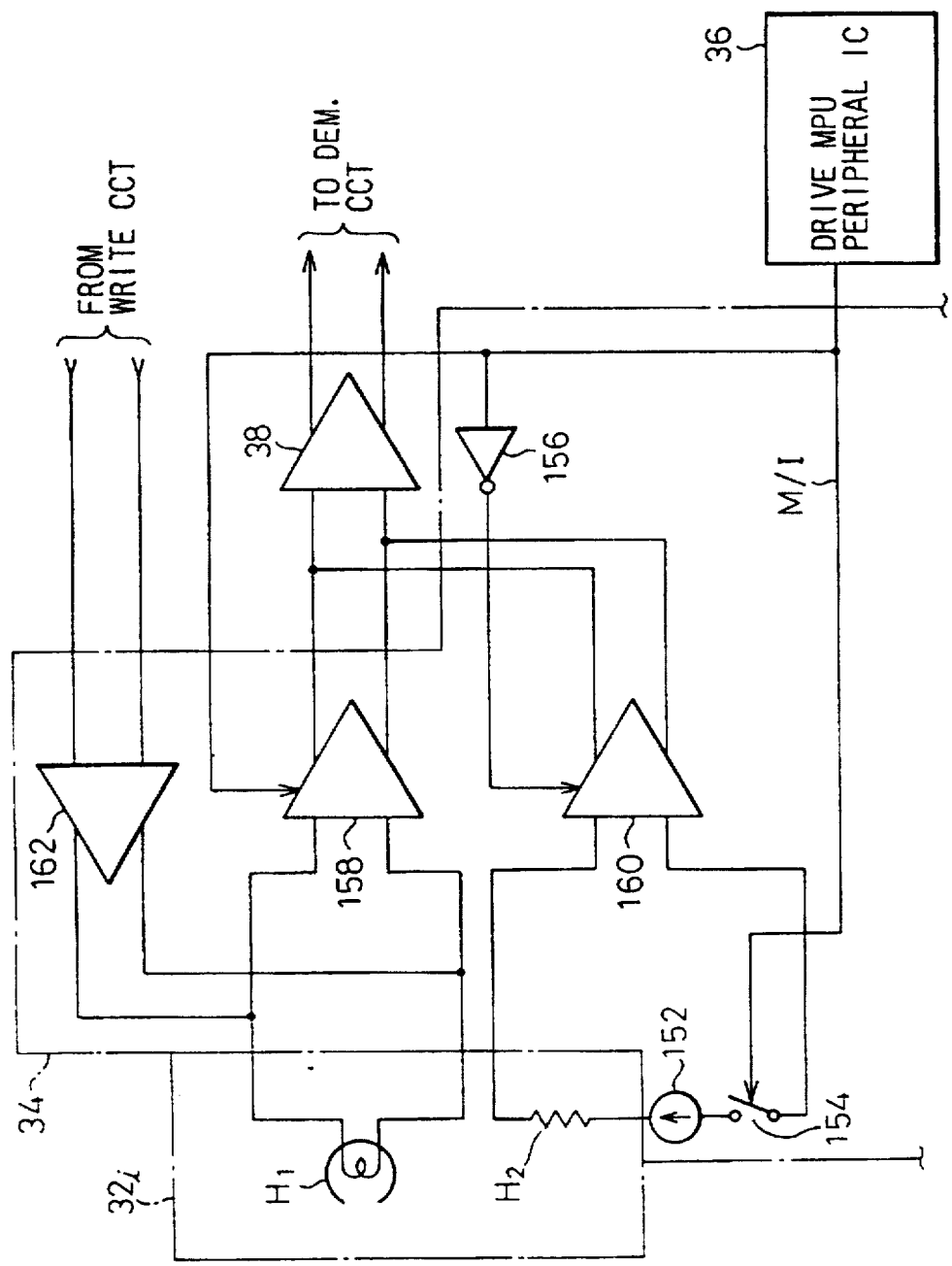

MAGNETIC DISK DRIVE UNIT WITH COMPLEX MAGNETIC HEAD OF VARIABLE READING WIDTH

BACKGROUND OF THE INVENTION

1. Field of the Invention

The present invention relates to a magnetic disk drive unit. More particularly, this invention is concerned with a magnetic disk drive unit that records or reproduces data in or from a magnetic recording medium using a recording and reproducing head (hereinafter referred to as a complex magnetic head) made by unifying an inductive head and a head utilizing a magneto-resistive effect (hereinafter referred to as a magneto-resistive effect (MR) head).

2. Description of the Related Art

In the past, there has been a tendency toward higher recording density in designing magnetic disk drive units. Accordingly, a complex magnetic head of the above type has been used as a magnetic head for such a magnetic disk drive unit. In such a complex magnetic head, for example, as shown in FIG. 8, a core of an MR head for reading has a smaller width than that of an inductive head for writing.

With the tendency toward higher recording density, in modern magnetic disk drive units including those utilizing a servo-surface servo system, servo information used for off-track compensation has been written on data surfaces. When a complex magnetic head is used, since the core of an MR head for reading has a smaller width than that of an inductive head for writing, a range (that is, an off-track measurable range) in which a position of a head on a track can be detected using the same data-surface servo pattern is narrower than that available in a conventional magnetic head in which a core for writing has the same width as a core for reading.

In a known magnetic disk drive unit using a complex magnetic head, for example, as shown in FIGS. 1a and 1b, a plurality of servo patterns (five patterns A to E in the illustrated example) are combined in order to expand the off-track measurable range.

As mentioned above, in a magnetic disk drive unit using a conventional complex magnetic head, a plurality of servo patterns are used in combination in order to expand a range in which servo information can be detected. This poses a problem in that the servo patterns are relatively complex. The complexity of the servo-patterns leads to a smaller number of samples picked up from one track of a magnetic disk (that is, the amount of data required for off-tracking compensation). This makes it difficult to correct eccentricity of a magnetic recording medium (magnetic disk) with precision. Moreover, it becomes time-consuming to calculate a position of a head using servo information.

SUMMARY OF THE INVENTION

An object of the present invention is to provide a magnetic disk drive unit that can detect servo information in a wide range using a relatively simple data-surface servo pattern and thus compensate for a quantity of off-tracking with high precision.

Noted in the present invention is that the core of an inductive head in a typical complex magnetic head usually has a larger width than that of a magneto-resistive head therein. When reading servo information, a reproduced output of the inductive head is used.

According to one aspect of the present invention, there is provided a magnetic disk drive unit that records or reproduces data in or from a magnetic recording medium using a complex magnetic head made by unifying an inductive head and a magneto-resistive head, comprising: a first read amplifying means connected to said inductive head; a second read amplifying means connected to said MR head; a selective output means for selecting either an output of said first read amplifying means or an output of said second read amplifying means in response to a switching control signal and supplying a selected output to a demodulation circuit; and a control means for supplying said switching control signal. When reading servo information written onto a data surface of said magnetic recording medium, said control means controls said switching control signal and thus causes said selective output means to select an output of said first read amplifying means associated with said inductive head.

Also, according to another aspect of the present invention, there is provided a magnetic disk drive unit for reproducing data from a magnetic recording medium using an MR head, wherein: said MR head includes a plurality of leads that make the width of a magneto-sensitive part of said MR head variable; and a pair of leads are selected from among said plurality of leads so that when servo information is read from a data surface of said magnetic recording medium using said MR head, said magneto-sensitive part of said MR head has a larger width than that used when ordinary data is read.

BRIEF DESCRIPTION OF THE DRAWINGS

Other objects and features of the present invention will be described hereinafter in detail by way of preferred embodiments with reference to the accompanying drawings, in which:

FIG. 2 is a block diagram showing the principle and configuration of a magnetic disk drive unit in accordance with the present invention;

FIG. 6 is a block diagram showing an example of a major circuitry relating to the present invention in the magnetic disk drive unit shown in FIG. 3;

DESCRIPTION OF THE PREFERRED EMBODIMENTS

Figure 1B:
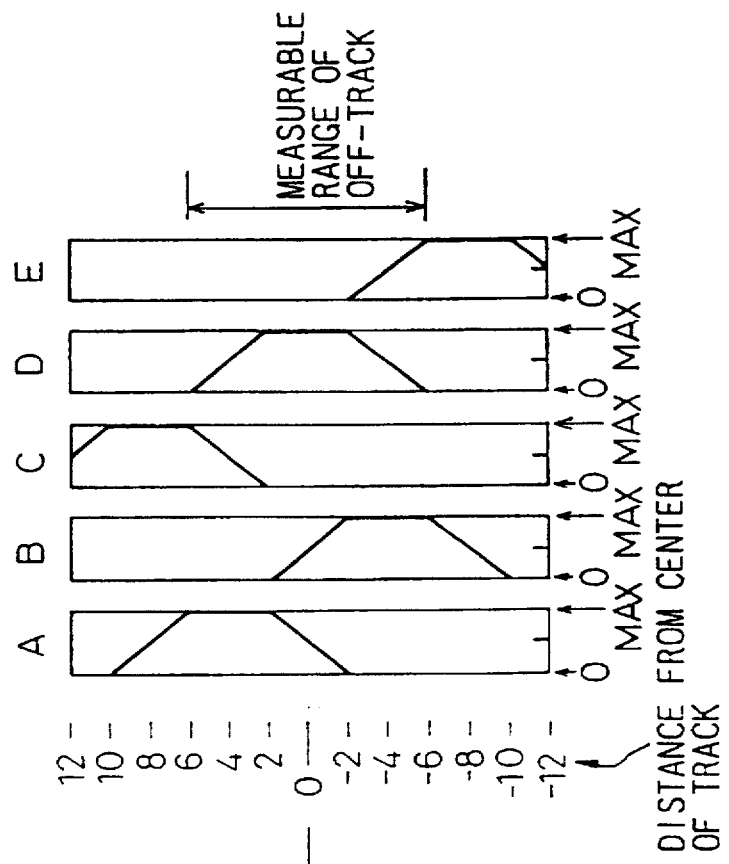
FIGS. 1a and 1b are explanatory diagrams concerning measurement of a quantity of off-tracking derived from the use of a magneto-resistive head in accordance with the prior art.

FIG. 2 shows a principle and configuration of a magnetic disk drive unit in accordance with the present invention.

Shown in FIG. 2 is a magnetic disk drive unit in which a complex magnetic head 1 made by unifying an inductive head 1A and an MR head 1B is used to record or reproduce data in or from a magnetic recording medium 2. The magnetic disk drive unit comprises a first read amplifying means connected to the inductive head 1A, a second read amplifying means 4 connected to the MR head 1B, a selective output means 5 for selectively supplying an output X or Y of the first or second read amplifying means 3 or 4 (providing a selected output Z) in response to a switching control signal SW, and a control means 6 for supplying the switching control signal SW.

When reading servo information from a data surface of the magnetic recording medium 2, the control means 6 controls the switching control signal SW and thus causes the selective output means 5 to select the output X of the first read amplifying means 3 associated with the inductive head 1A.

According to the configuration shown in FIG. 2, the reproduced output signal X of the inductive head 1A available through the first read amplifying means 3 or the reproduced output signal Y of the MR head 1B available through the second read amplifying means 4 is selected in response to the switching control signal SW supplied by the control means 6 and the action of the selective output means 5 responsive to the switching control signal SW, and then fed to a demodulation circuit 7. When reading servo information from a data surface of the magnetic recording medium 2, the reproduced output of the inductive head 1A is selected.

As described above, in a typical complex magnetic head, the core of an inductive head has a considerably larger width than that of an MR head. When the inductive head is used to read servo information, compared with when the MR head is used, the detectable range of servo information can be considerably expanded.

Consequently, even the employment of relatively simple data-surface servo patterns (servo information) enables detection of servo information in a wide range. This results in high-precision off-tracking compensation.

Next, preferred embodiments of the present invention will be described with reference to FIGS. 3 to 11.

Figure 3:
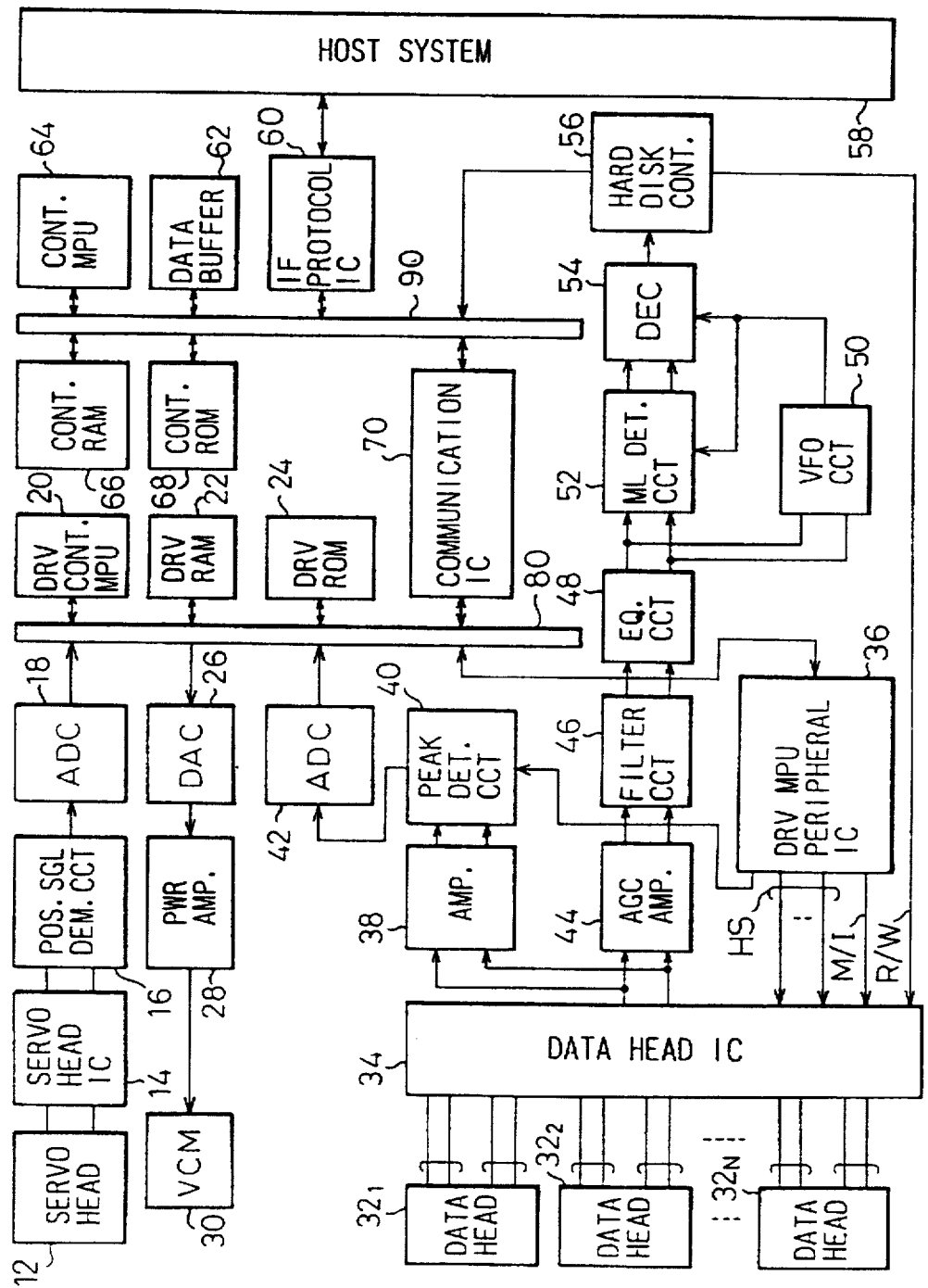
FIG. 3 is a block diagram showing an overall configuration of a magnetic disk drive unit in accordance with an embodiment of the present invention.

FIG. 3 shows an overall configuration of a magnetic disk drive unit in accordance with an embodiment of the present invention. However, the circuitry responsible for writing is not shown because it is not directly related to the gist of the present invention.

In FIG. 3, reference numeral 12 denotes a servo head formed solely with an inductive head and positioned on the opposite side of a servo surface of a magnetic disk (a complex magnetic head will do). 14 denotes a servo head IC for processing a signal reproduced by the servo head 12. 16 denotes a circuit for demodulating a position signal contained in a reproduced output. 18 denotes a circuit for converting a demodulated position signal into a digital signal. 20 denotes a drive control MPU for controlling processing required for controlling positioning of a head achieved by a voice coil motor (VCM) and rotating of a magnetic disk achieved by a spindle motor (SPM). 22 denotes a drive RAM used by the drive control MPU 20. 24 denotes a drive ROM used by the drive control MPU 20. 26 denotes a circuit for converting digital information, which is used for positioning control made by the voice coil motor, into an analog signal. 28 denotes a power amplifier for amplifying the analog signal. 30 denotes a voice coil motor for controlling positioning of a head in response to the amplified signal.

Reference numerals $32_1$ to $32_N$ denote data heads that are complex magnetic heads and positioned on the opposite side of associated data surfaces of magnetic disks. 34 denotes a data head IC for controlling the data heads in recording or reproducing data. 36 denotes a drive MPU peripheral IC for controlling the data heads using a head select signal HS and a switching control signal M/I and for controlling demodulation of data-surface servo information. 38 denotes an amplifier for amplifying a data-surface servo signal supplied via the data head IC 34. 40 denotes a peak detection circuit for detecting and holding a peak value of an amplified signal. 42 denotes a circuit for converting an output signal of the peak detection circuit 40 into a digital signal. The circuit elements 38 to 42 constitute a demodulator for data-surface servo information. A signal demodulated by the demodulator is used for compensating for an quantity of off-tracking of each data head.

Reference numeral 44 denotes an automatic gain control amplifier for amplifying data provided by the data head IC 34. 46 denotes a filter circuit for removing unnecessary components from an amplified signal. 48 denotes an equalizer for correcting the frequency response of a filtered signal in terms of amplitude or phase. 50 denotes a VFO circuit responsive to an output of the equalizer 48. 52 denotes a maximum likelihood detection circuit for detecting a level of an output signal of the equalizer 48. 54 denotes a decoder (DEC) for demodulating a reproduced signal such as a 1/7 code provided by the maximum level detection circuit 52 into NRZ data. 56 denotes a hard disk controller for receiving demodulated data and controlling reading or writing (R/W) of data from or into a magnetic disk. The circuit elements 44 to 54 constitute a demodulator for data.

Reference numeral 60 denotes an interface (IF) protocol IC for controlling interface with an external host system 58. 62 denotes a data buffer for storing data transferred to or from the host system 58. 64 denotes a controller control MPU for controlling analysis or execution of a command sent from the host system 58. 66 denotes a controller RAM used by the controller control MPU 64. 68 denotes a controller ROM used by the controller control MPU 64. 70 denotes an inter-MPU communication IC for controlling communication between the controller control MPU 64 and the drive control MPU 20 or drive MPU peripheral IC 36. 80 and 90 denote buses over which the circuit elements are interconnected.

Figure 4:
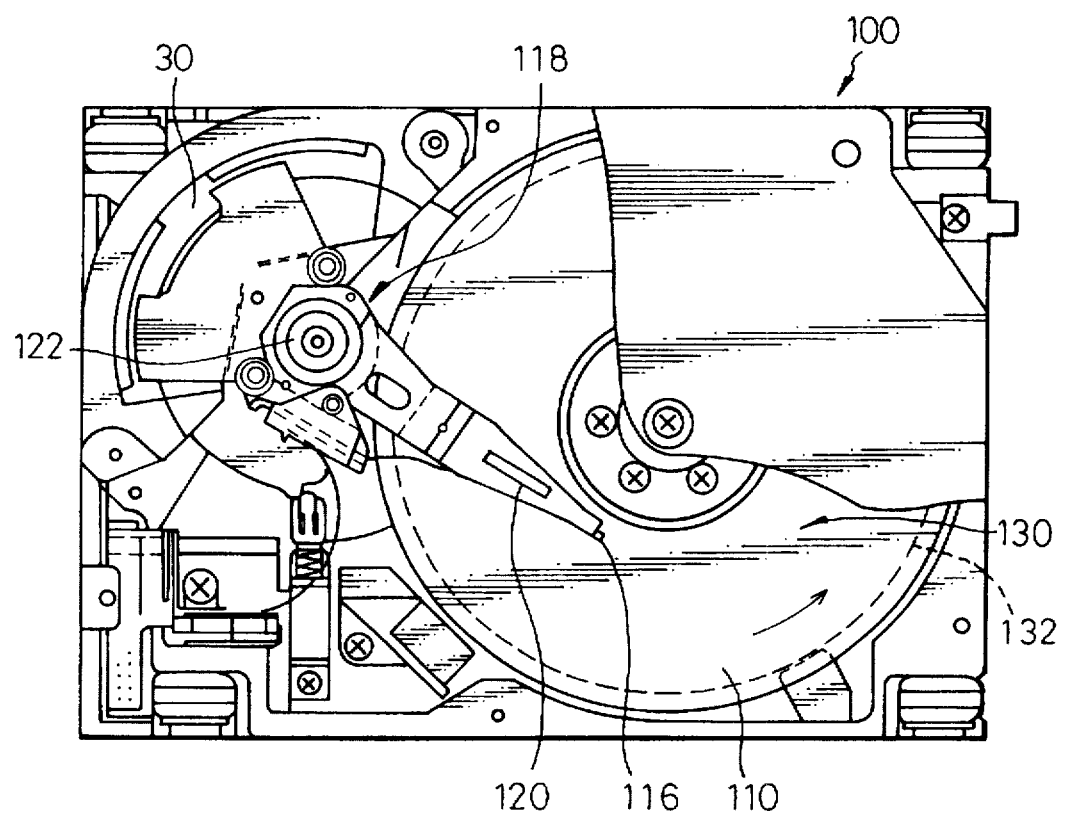
FIG. 4 is a plan view showing a structure of the magnetic disk drive unit shown in FIG. 3.
Figure 5:
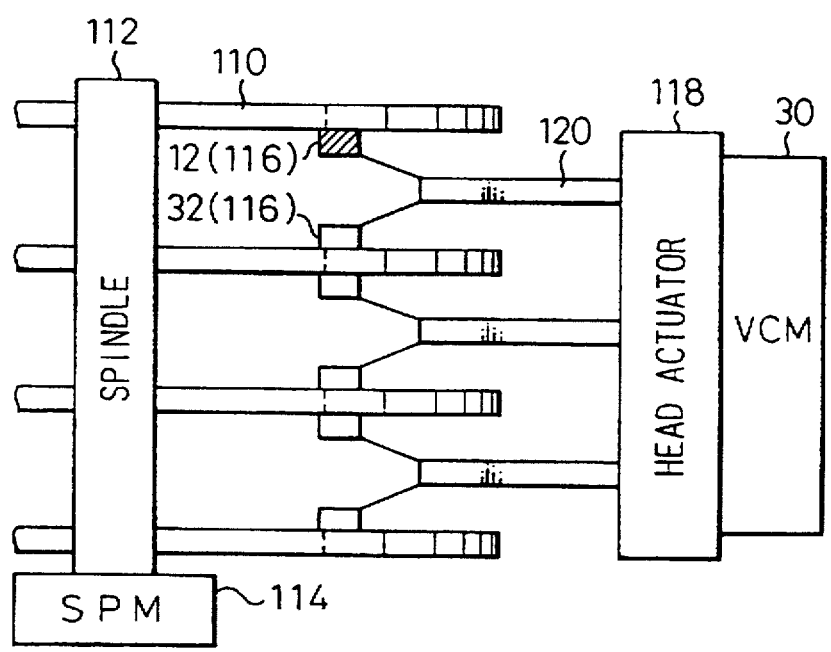
FIG. 5 is a side view schematically showing the structure of the magnetic disk drive unit shown in FIG. 3.

FIG. 4 shows an example of a structure of a magnetic disk drive unit in accordance with this embodiment. FIG. 5 schematically shows a side of the structure.

In FIG. 4, reference numeral 100 denotes a disk enclosure containing magnetic disks 110. In the example of FIG. 5, four magnetic disks 110 are held rotatably by means of a disk rotation unit (composed of the spindle 112 and spindle motor 114). Sliders 116 for servo heads 12 and data heads 32 are attached to the tips of arms 120 of a head actuator (or carriage) 118. The sliders 116 are pivoted with a shaft 122, driven by the voice coil motor 30, and thus controlled in position. On each of the surfaces of the magnetic disks 110, data surfaces comparable to a plurality (for example, 1000 to 1500) of tracks 130 on which data is recorded are formed concentrically. A set of tracks with the same nominal distance from the shaft is regarded as a cylinder. One of the tracks on each of the magnetic disks (for example, the tracks along the outer circumferences of the disks) are used to record servo data and are referred to, collectively as a servo cylinder 132.

FIG. 6 shows an example of a major circuitry (demodulator) relating to the present invention in a magnetic disk drive unit of this embodiment.

In FIG. 6, a portion defined by a dot-dash line (indicated by reference numeral 32i) includes the data heads $32_1$ to $32_N$ shown in FIG. 3. Each of the data heads is made by unifying an inductive head $H_1$ and a magneto-resistive head $H_2$. In this embodiment, the inductive head $H_1$ is used to write data on a magnetic disk or to read servo information for off-tracking compensation from a data surface of a magnetic disk. On the other hand, the magneto-resistive head $H_2$ is used to read data from a magnetic disk.

For the data head IC 34, reference numeral 152 denotes a constant current source for supplying certain bias current to the magneto-resistive heads $H_2$. 154 denotes a switch for controlling the on or off state of the constant current source 152 (that is, for controlling supply or blockade of bias current). In this embodiment, when the switching control signal M/I sent from the drive MPU peripheral IC 36 is driven low, the switch 154 is turned on (made). When the switching control signal M/I is driven high, the switch 154 is turned off (broken). When a reproduced output of the inductive head $H_1$ is selected, the switch 154 is turned off. Bias current applied to the magneto-resistive head $H_2$ is blocked accordingly. The purpose of blocking the bias current lies in the intention of preventing a magnetic field induced by the bias current from affecting the inductive head $H_1$.

Reference numeral 156 denotes an inverter responsive to the switching control signal M/I. 158 denotes a read preamplifier responsive to a reproduced output of an inductive head $H_1$. 160 denotes a read preamplifier responsive to a reproduced output of a magneto-resistive head $H_2$. In this embodiment, when the switching control signal M/I is high, the read preamplifier 158 is active. When the switching control signal M/I is low, the read preamplifier 160 is active. Outputs of the read preamplifiers 158 and 160 are selectively fed to an amplifier 38 for handling a data-surface servo signal. 162 denotes a write driver for converting write data sent from a writing circuit (not shown) into write current and supplying the write current to the inductive head $H_1$.

Figure 7A:
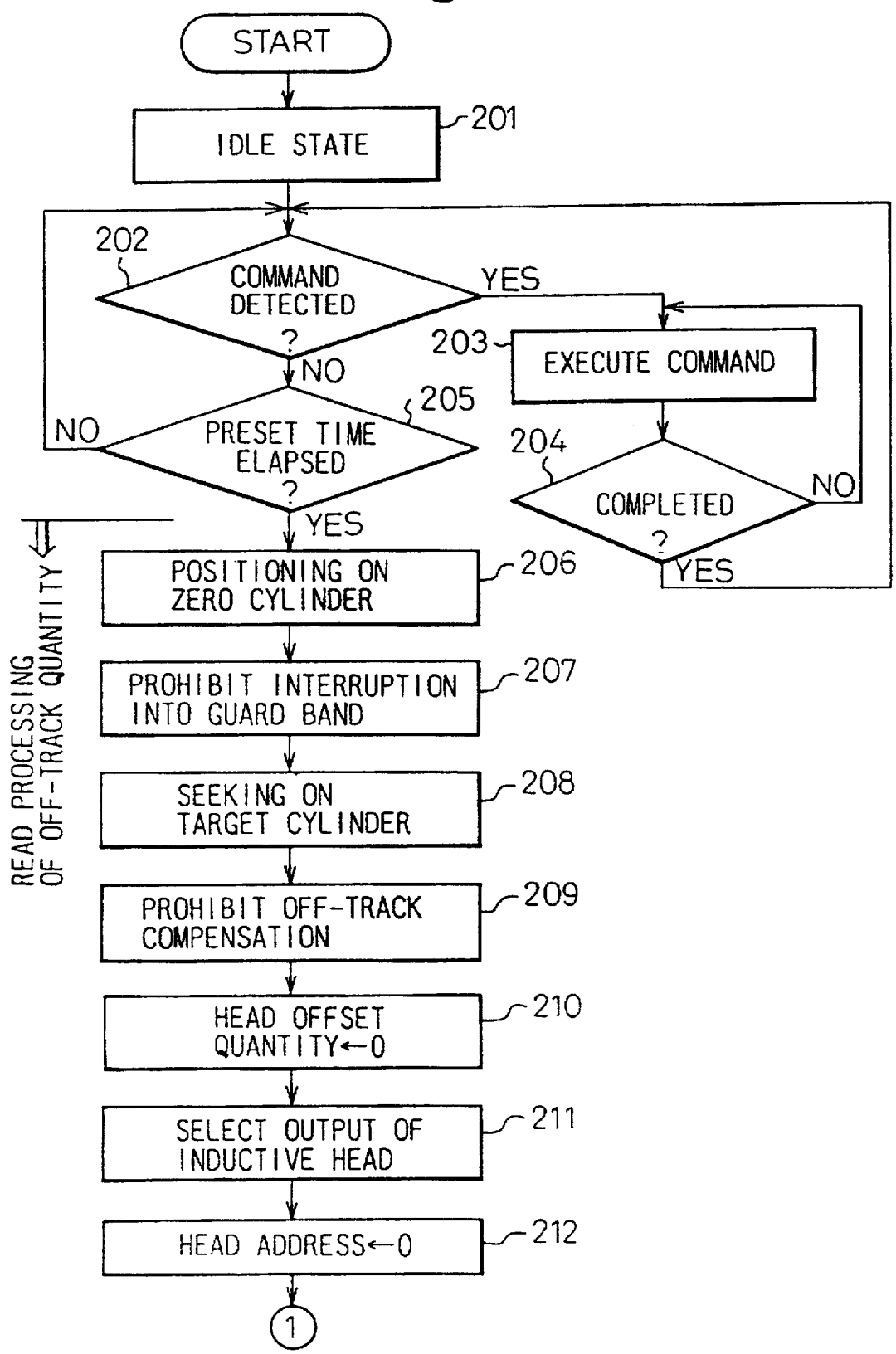
FIGS. 7a to 7c are flowcharts representing an example of a sequence of reading data-surface servo information that is executed by the magnetic disk drive unit shown in FIG. 3.
Figure 7B:
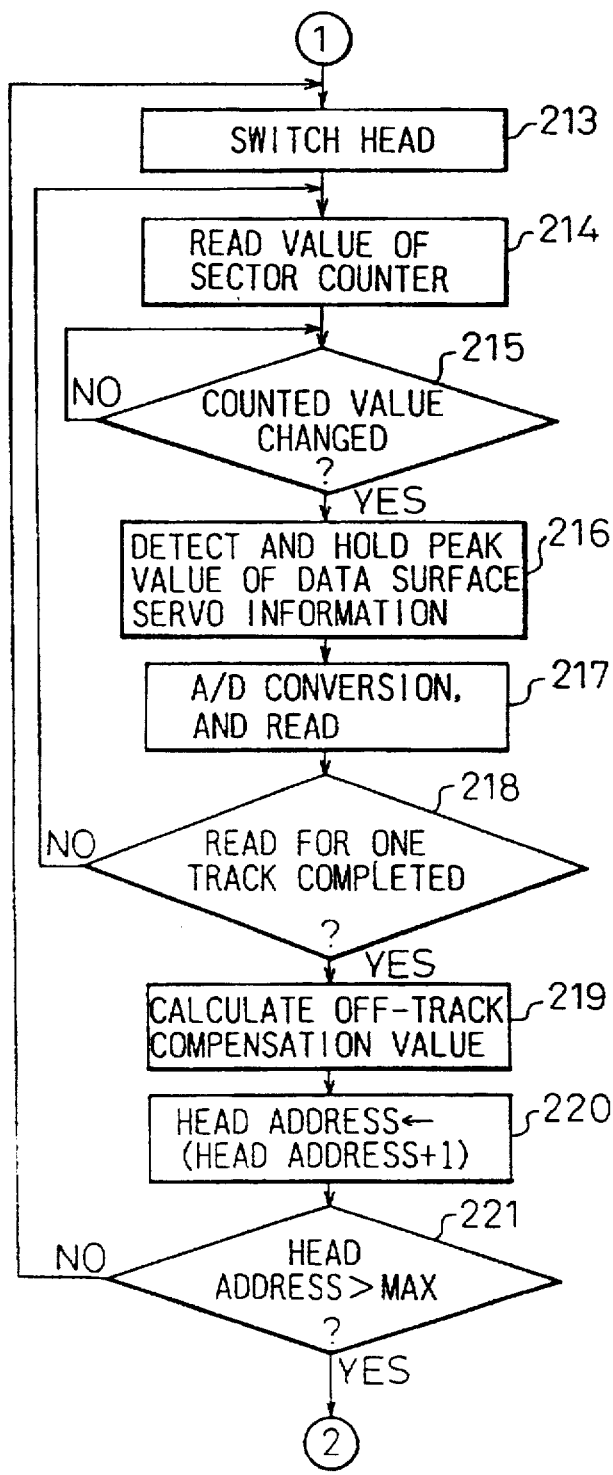
Figure 7C:
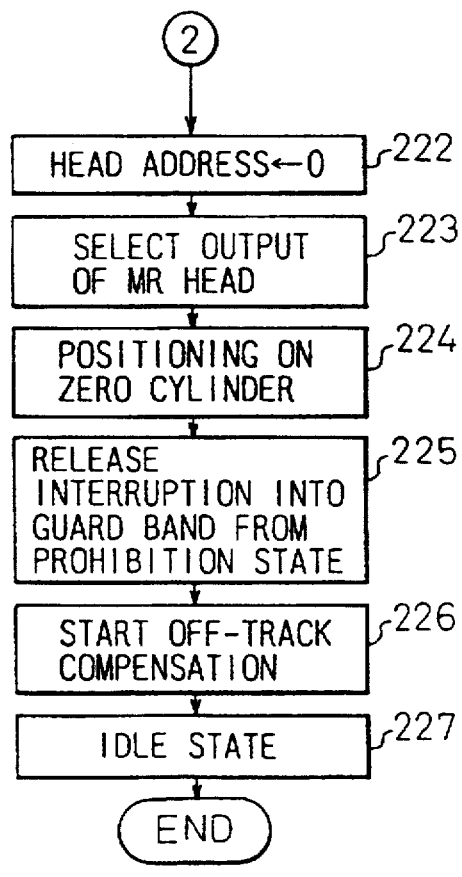

Next, an example of a sequence of reading data-surface servo information which is executed by a magnetic disk drive unit of this embodiment will be described with reference to the flowcharts of FIGS. 7a to 7c.

First, the drive unit enters an idle state at step 201. At step 202, it is determined whether a command is detected. If the result of determination is in the affirmative, control is passed to step 203. If the result of determination is in the negative, control is passed to step 205. At step 203, the command is executed. At step 204, it is determined whether execution of the command is completed. If the result of determination is in the affirmative, control is returned to step 203. The foregoing processing is rerun. At step 205, it is determined whether a given period of time has elapsed. If the result of determination is in the affirmative, control is passed to step 206. If the result of determination is in the negative, control is returned to step 202. The foregoing processing is then rerun.

The processing after step 206 is off-tracking value reading.

First, a data head is positioned at cylinder 0 at step 206. At step 207, it is disabled to issue an interrupt for a guard band (which is located outside a data field and for which an interrupt signal is generated when the head outreaches the data field). At step 208, the head seeks for a target cylinder on which data-surface servo information is written.

At step 209, off-tracking compensation is disabled. At step 210, an offset of the data head is set to zero.

At step 211, an output of an inductive head is provided (or selected) as an output of the data head IC. At step 212, a head address is set to zero. At step 213, the data head is switched into another one. At step 214, a count value of a servo sector counter is read. At step 215, it is determined whether the count value of the servo sector counter has changed. If the result of this determination is in the affirmative, control is passed to step 216. If the result of this determination is in the negative, the processing of step 215 is rerun.

At step 216, a peak value contained in the data-surface servo information is detected and held. At step 217, the data-surface servo information (signal) having the peak value held is converted into a digital form and read. At step 218, it is determined whether reading of data-surface servo information from one track (included in the cylinder) is completed. If the result of this determination is in the affirmative, control is passed to step 219. If the result of this determination is in the negative, control is returned to step 214. The foregoing processing is then rerun.

At step 219, an off-tracking compensation value is calculated using the read data-surface servo information. At step 220, the current head address is incremented by one, and thus a new head address value is specified (in other words, the head address is advanced).

Next, at step 221, it is determined whether the head address exceeds a maximum value. If the result of this determination is in the affirmative, control is passed to step 222. If the result of this determination is in the negative, control is returned to step 213. The foregoing processing is then rerun. At step 222, the head address is set to zero.

At step 223, an output of the magneto-resistive head is provided (or selected) as an output of the data head IC. At step 224, the data head is positioned at cylinder 0. At step 225, it is enabled to issue an interrupt for the guard band. At step 226, off-tracking compensation is started. At step 227, the drive unit enters the idle state. This sequence then terminates.

Figure 8:
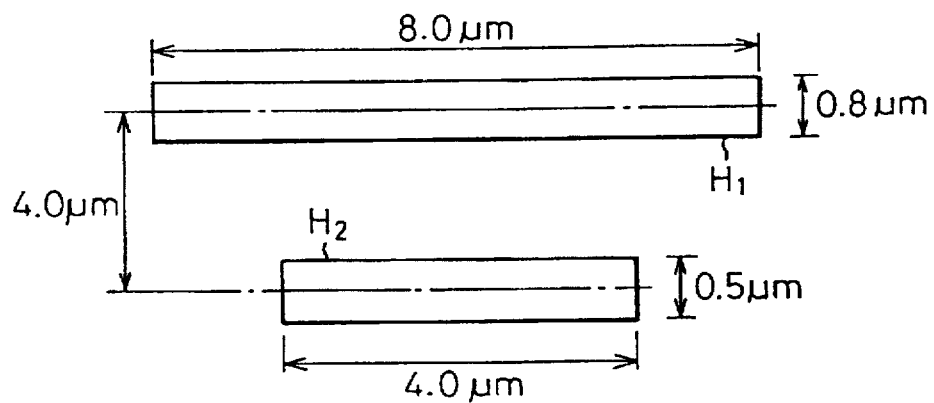
FIG. 8 schematically shows a composition of a complex magnetic head shown in FIG. 6.
Figure 9:
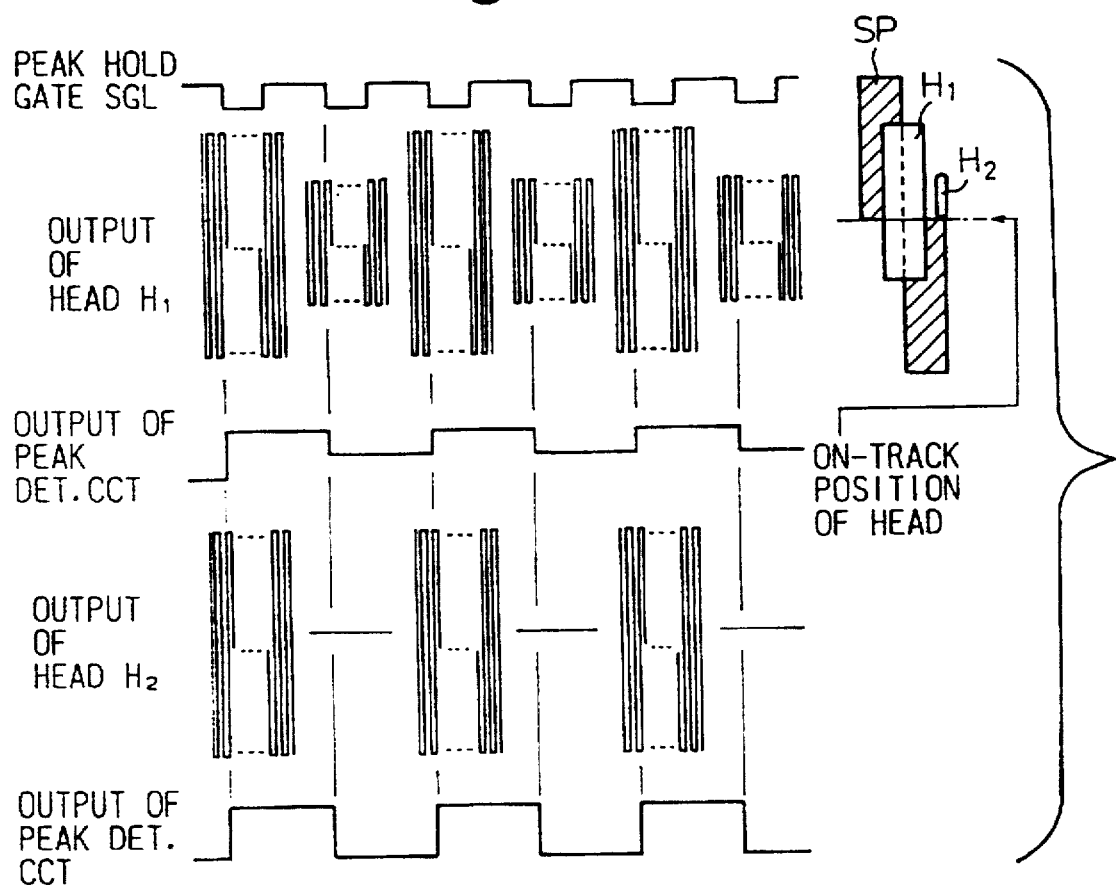
FIG. 9 is an explanatory diagram concerning waveforms of outputs provided by the complex magnetic head shown in FIG. 8.
Figure 10B:
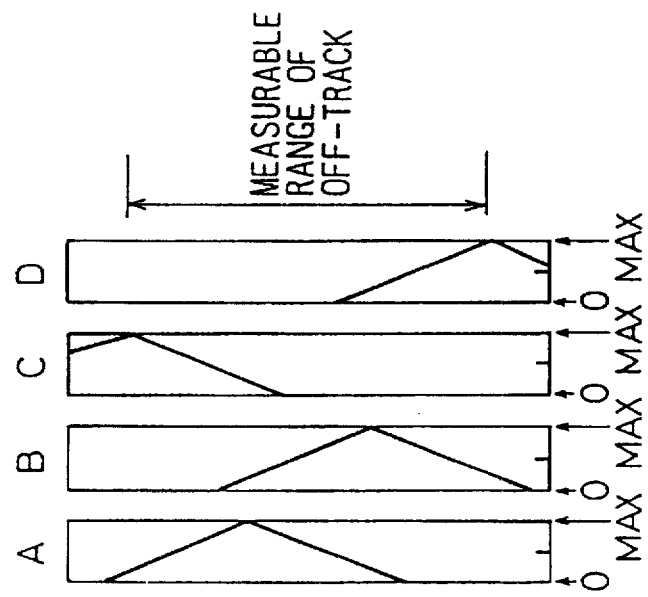
FIGS. 10a and 10b are explanatory diagrams concerning measurement of a quantity of off-tracking derived from the use of an inductive head shown in FIG. 8.
Figure 10A:
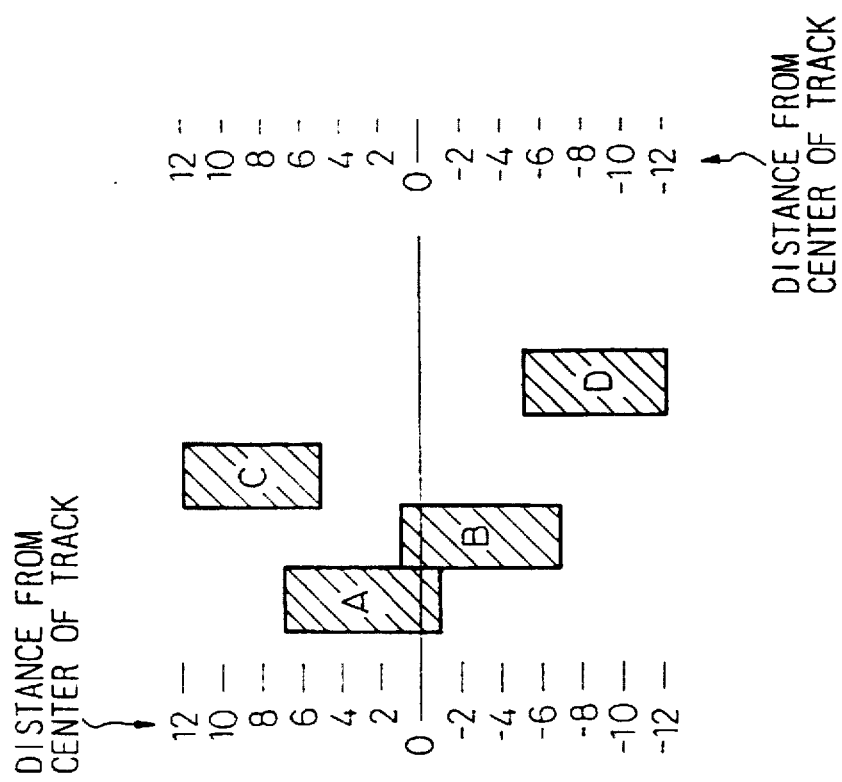

FIG. 8 schematically shows a composition of a complex magnetic head (an inductive head $H_1$ and a magneto-resistive head $H_2$) employed in this embodiment. FIG. 9 shows examples of waveforms of outputs provided by the heads $H_1$ and $H_2$ when they read data-surface servo information under the same circumstances.

As shown in FIG. 8, the core of the inductive head $H_1$ has a larger width (8.0 micrometers in the example illustrated) than the one of the magneto-resistive head $H_2$ (4.0 micrometers in the example illustrated). In FIG. 9, a hatched area SP indicates a servo pattern representing data-surface servo information.

As described so far, according to the magnetic disk drive unit (See mainly FIG. 6) of this embodiment, for reading, the drive MPU peripheral IC 36 drives the switching control signal M/I high or low. Thus, either a reproduced output of the inductive head $H_1$ or a reproduced output of the magneto-resistive head $H_2$ is selected and the selected output is supplied to the data-surface servo information demodulator. To be more specific, for reading servo information from a data surface, the switching control signal M/I is driven high in order to select the output of the inductive head $H_1$. For reading normal data, the switching control signal M/I is driven low in order to select the output of the magneto-resistive head $H_2$. When the output of the inductive head $H_1$ is selected, the selected output is supplied to the servo information demodulator. A quantity of off-tracking of a selected data head is then calculated, so that the servo head can compensate for the quantity of off-tracking.

According to the configuration of this embodiment, the signal levels of the switching control signal M/I are changed appropriately. Thus, an output of the inductive head $H_1$ can be used as data-surface servo data.

Figure 1A:
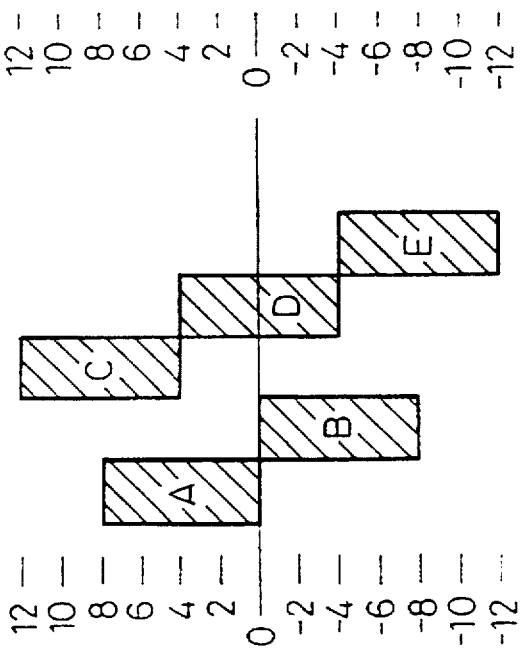

In a conventional drive unit (See FIGS. 1a and 1b), the combination of a magneto-resistive head and data-surface servo patterns A to E merely enables measurement of a quantity of off-tracking in the range of ±6 micrometers. In this embodiment (See FIGS. 10a and 10b), the signal levels of the switching control signal M/I are changed in order to adopt an output of the inductive head $H_1$ for reading. Thus, servo patterns (four patterns A to D in FIG 10a) that are simpler than the servo patterns employed in the conventional drive unit are used to measure a quantity of off-tracking in the range of ±9 micrometers.

The employment of the simplified data-surface servo patterns leads to a relative increase in the number of servo patterns per track (in other words, in the amount of off-tracking compensation data). This results in high-precision measurement of a quantity of off-tracking, especially, a quantity of decentering.

Furthermore, assuming that the magneto-resistive head $H_2$ breaks down, as long as the inductive head $H_1$ is unaffected, when the switching control signal M/I is set to a signal level enabling selection of an output of the inductive head $H_1$, data on a medium can be read by operating the inductive head $H_1$ but not renewing the magneto-resistive head $H_2$. Thus, renewal of a head is unnecessary.

Figure 11:
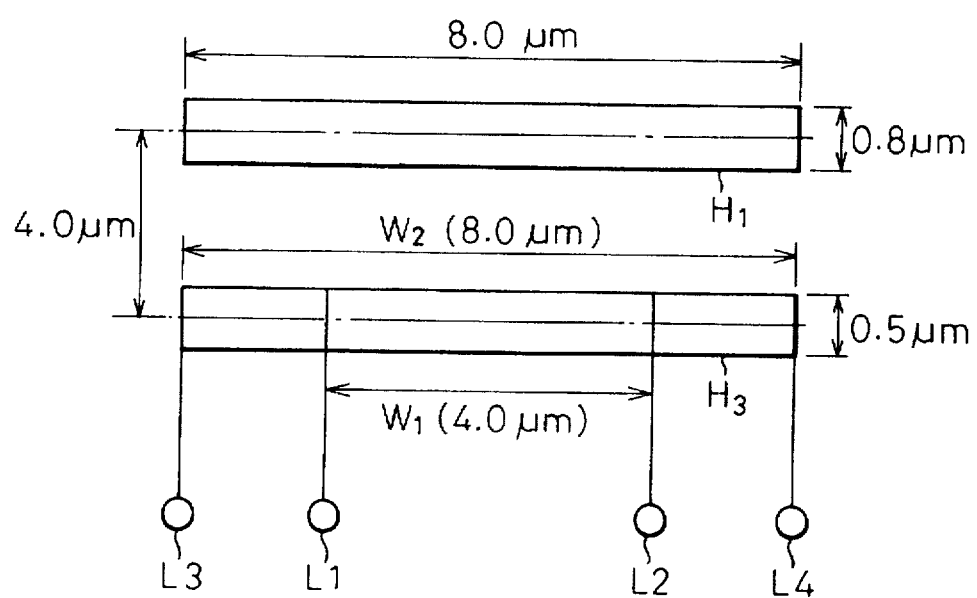
FIG. 11 schematically shows a composition of a complex magnetic head in another embodiment of the present invention.

FIG. 11 schematically shows a composition of a complex magnetic head in another embodiment of the present invention.

In the aforesaid embodiment (See FIGS. 6 and 8), the core of an inductive head usually has a larger width than the one of a magneto-resistive head. In this embodiment, the magneto-sensitive part of a magneto-resistive head has a variable width.

As shown in FIG. 11, a magneto-resistive head $H_3$ has four leaders L1 to L4 that make the width of a magneto-sensitive part thereof variable. A pair of the inner leaders L1 and L2 is selected for reading normal data, and used to extract a reproduced output of a head whose magneto-sensitive part has a width ($W_1$=4.0 micrometers in the example illustrated) that is smaller than the width of the magneto-sensitive part of the inductive head $H_1$ (8.0 micrometers in the example illustrated). A pair of the outer leaders L3 and L4 is selected for reading servo information for off-tracking compensation, and used to extract a reproduced output of a head whose magneto-sensitive part has a width ($W_2$=8.0 micrometers) that is the same as the one of the magneto-sensitive part of the inductive head $H_1$.

According to this embodiment, when servo information for off-tracking compensation is to be read, the magneto-sensitive part of the magneto-resistive head $H_3$ has a larger width than that when normal data is to be read. Similarly to the previous embodiment, the employment of relatively simple data-surface servo patterns enables detection of servo information in a wide range. This realizes high-precision off-tracking compensation, and eventually improves operational reliability of a magnetic disk drive unit.

As an example of application, the present invention may be implemented in a sector servo type magnetic disk drive unit. In this case, a positioning servo pattern and data are recorded alternately on each track or data surface. A servo pattern is reproduced by an inductive head, while data is reproduced by a magneto-resistive head.

Although the present invention has been disclosed and described by way of two embodiments, it is apparent to those skilled in the art that other embodiments and modifications of the present invention are possible without departing from the essential features thereof.

What is claimed is:

1. A magnetic disk drive unit for reproducing data from a magnetic recording medium using a magneto-resistive effect head and for recording data using a recording head, the magnetic recording medium including a data region for recording ordinary data and a servo information region which is formed independently of the data region and includes at least one block of servo information recorded thereon, wherein:

said recording head includes a recording core of a first width, whereby said first width corresponds to a width of data which can be recorded by said recording head;

said magneto-resistive effect head comprises a plurality of leads that make the width of a magneto-sensitive part of said magneto-resistive effect head variable between at least two different widths, including a width that is substantially equivalent to said first width of said recording core and a second width that is narrower than said first width; and wherein a pair of leads are selected from among said plurality of leads so that when servo information is to be read from said magnetic recording medium using said magneto-resistive effect head, said magneto-sensitive part of said magneto-resistive effect head is designated to be of said first width and when ordinary data is to be read from said magnetic recording medium said magneto-sensitive part of said magneto-resistive head is designated to be of said second width.

2. The magnetic disk drive unit according to claim 1, wherein said plurality of leads includes a pair of leads for picking up a reproduced output of a head corresponding to said first width, and a pair of leads for picking up a reproduced output of a head corresponding to said second width.

3. The magnetic disk drive unit according to claim 1, wherein servo information written on a data surface of said magnetic recording medium is used for off-tracking compensation.

4. A magnetic disk drive unit that records and reproduces data from a magnetic recording medium, the magnetic recording medium including a data region for recording ordinary data and a servo information region which is formed independently of the data region and includes at least one block of servo information recorded thereon, said magnetic disk drive unit comprising:

a recording head that includes a recording portion;

a reproducing head that includes a first reading portion having a magneto-sensitive part of a first width and a second reading portion having a magneto-sensitive part of a second width, which is narrower than said first width; and means for selecting said second reading portion when reading ordinary data written onto a data surface of said magnetic recording medium, and for selecting said first reading portion when reading servo information written onto the data surface of said magnetic recording medium.

5. The magnetic disk drive unit according to claim 4, wherein said at least one magnetic head comprises a magneto-resistive effect head and an inductive head, and wherein said first reading portion is provided on the magneto-resistive effect head and said second reading portion is provided on the inductive head.

6. The magnetic disk drive unit according to claim 4, wherein said at least one magnetic head comprises a magneto-resistive effect head, and wherein said first and second reading portions are provided on the magneto-resistive effect head.

7. The magnetic disk drive unit according to claim 6, wherein said magneto-resistive effect head includes a plurality of leads, said first reading portion is defined between a first pair of said leads, and said second reading portions is defined between a second pair of said leads.

* * * * *